US011710287B2

(12) United States Patent
Martin Brualla et al.

(10) Patent No.: US 11,710,287 B2
(45) Date of Patent: Jul. 25, 2023

(54) GENERATIVE LATENT TEXTURED PROXIES FOR OBJECT CATEGORY MODELING

(71) Applicant: GOOGLE LLC, Mountain View, CA (US)

(72) Inventors: Ricardo Martin Brualla, Seattle, WA (US); Daniel Goldman, Seattle, WA (US); Sofien Bouaziz, Los Gatos, CA (US); Rohit Kumar Pandey, Mountain View, CA (US); Matthew Brown, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/309,817

(22) PCT Filed: Aug. 4, 2020

(86) PCT No.: PCT/US2020/070359
§ 371 (c)(1),
(2) Date: Jun. 21, 2021

(87) PCT Pub. No.: WO2022/005523
PCT Pub. Date: Jan. 6, 2022

(65) Prior Publication Data
US 2022/0051485 A1     Feb. 17, 2022

Related U.S. Application Data

(60) Provisional application No. 62/705,500, filed on Jun. 30, 2020.

(51) Int. Cl.
*G06T 19/20* (2011.01)
*G06T 15/00* (2011.01)
(Continued)

(52) U.S. Cl.
CPC ............ *G06T 19/20* (2013.01); *G06T 15/005* (2013.01); *G06T 15/04* (2013.01); *G06T 15/506* (2013.01);
(Continued)

(58) Field of Classification Search
None
See application file for complete search history.

(56) References Cited

U.S. PATENT DOCUMENTS 10,529,137 B1    1/2020  Black et al.
11,010,951 B1 *  5/2021  Schwartz ................ G06F 3/011
(Continued)

OTHER PUBLICATIONS

Stephen Lombardi, Jason Saragih, Tomas Simon, Yaser Sheikh, "Deep Appearance Models for Face Rendering", Aug. 2018, ACM, ACM Transactions on Graphics, vol. 37, No. 4, Article 68.*

(Continued)

*Primary Examiner* — Robert Bader
(74) *Attorney, Agent, or Firm* — Brake Hughes Bellermann LLP

(57) ABSTRACT

Systems and methods are described for generating a plurality of three-dimensional (3D) proxy geometries of an object, generating, based on the plurality of 3D proxy geometries, a plurality of neural textures of the object, the neural textures defining a plurality of different shapes and appearances representing the object, providing the plurality of neural textures to a neural renderer, receiving, from the neural renderer and based on the plurality of neural textures, a color image and an alpha mask representing an opacity of at least a portion of the object, and generating a composite image based on the pose, the color image, and the alpha mask.

20 Claims, 9 Drawing Sheets

(51) Int. Cl.
  *G06T 15/04* (2011.01)
  *G06T 15/50* (2011.01)
  *G06V 10/94* (2022.01)

(52) U.S. Cl.
  CPC ...... *G06V 10/95* (2022.01); *G06T 2219/2012* (2013.01); *G06T 2219/2021* (2013.01)

(56) References Cited

U.S. PATENT DOCUMENTS

2020/0327718 A1* 10/2020 Saragih ............... G06T 7/55
2021/0312698 A1* 10/2021 He ...................... G06V 20/647

OTHER PUBLICATIONS

Piotr Bojanowski, Armand Joulin, David Lopez-Paz, Arthur Szlam, "Optimizing the Latent Space of Generative Networks", May 20, 2019, arxiv.org, https://arxiv.org/abs/1707.05776, Proceedings of the 35th International Conference on Machine Learning.*

Zhengqin Li, Yu-Ying Yeh, Manmohan Chandraker, "Through the Looking Glass: Neural 3D Reconstruction of Transparent Shapes", Jun. 19, 2020, IEEE, 2020 IEEE/CVF Conference on Computer Vision and Pattern Recognition (CVPR).*

Michael Niemeyer, Lars Mescheder, Michael Oechsle, Andreas Geiger, "Differentiable Volumetric Rendering: Learning Implicit 3D Representations without 3D Supervision", Jun. 19, 2020, IEEE, 2020 IEEE/CVF Conference on Computer Vision and Pattern Recognition (CVPR).*

Vincent Sitzmann, Michael Zollhöfer, Gordon Wetzstein, "Scene Representation Networks: Continuous 3D-Structure-Aware Neural Scene Representations", Dec. 2019, Curran Associates Inc., NIPS'19: Proceedings of the 33rd International Conference on Neural Information Processing Systems, Article No. 101.*

International Search Report and Written Opinion for PCT Application No. PCT/US2020/070359, dated Mar. 19, 2021, 12 pages.

Decoret, et al., "Billboard Clouds for Extreme Model Simplification", ACM Transactions on Graphics, ACM, NY, US; vol. 22, No. 3; Jul. 3, 2003, 8 pages.

Lombardi, et al., "Neural Volumes: Learning Dynamic Renderable Volumes From Images", ACM Trans. Graph., vol. 38, No. 4, Article 65; Jul. 12, 2019, 14 pages.

Tewari, et al., "State of the Art on Neural Rendering", vol. 39, No. 2; arXiv:2004.03805v1; Apr. 8, 2020, 27 pages.

Thies, et al., "Deferred Neural Rendering: Image Synthesis Using Neural Textures", ACM Transactions on Graphics, ACM, NY, US; vol. 38, No. 4; Jul. 12, 2019, 12 pages.

* cited by examiner

GENERATIVE LATENT TEXTURED PROXIES FOR OBJECT CATEGORY MODELING

CROSS REFERENCE TO RELATED APPLICATIONS

This application is a 35 U.S.C. § 371 National Phase Entry Application from PCT US2020/070359, filed Aug. 4, 2020, designating the U.S., and claims the benefit of U.S. Provisional Application No. 62/705,500, filed Jun. 30, 2020, the disclosures of which are incorporated herein by reference in their entireties.

TECHNICAL FIELD

This description generally relates to methods, devices, and algorithms used in generating content for presentation on a display.

BACKGROUND

A generative model is a type of machine learning model that is used to generate data that is consistent with training data. The generative model can learn a model of a dataset in order to generate data similar to the training data included in the dataset. For example, a generative model may be trained to determine the probability distribution p(X, Y) of features X and labels Y of a dataset. A computer system programmed to execute the generative model may be provided with a label Y. In response, the computer system may generate a feature or set of features X that are consistent with the label Y.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described for utilizing at least one processing device to perform operations including at least receiving a pose associated with an object in image content, generating a plurality of three-dimensional (3D) proxy geometries of the object, generating, based on the plurality of 3D proxy geometries, a plurality of neural textures of the object where the neural textures define a plurality of different shapes and appearances representing the object, providing the plurality of neural textures to a neural renderer where the plurality of neural textures are provided in a stacked formation, receiving, from the neural renderer and based on the plurality of neural textures, a color image and an alpha mask representing an opacity of at least a portion of the object, and generating a composite image based on the pose, the color image, and the alpha mask.

These and other aspects can include one or more of the following, alone or in combination. For example, the method may also include rendering a latent texture onto a target viewpoint based at least in part on the pose associated with the object, wherein each of the plurality of 3D proxy geometries include a coarse geometric approximation of at least a portion of the object and the latent texture of the object mapped to the coarse geometry approximation. In some implementations, the plurality of neural textures are configured to reconstruct a hidden portion of the object captured in the image content where the hidden portion is reconstructed based on the stacked formation of the neural textures enabling the neural renderer to generate transparent layers of the object and surfaces behind the transparent layers of the object.

In some implementations, each of the plurality of 3D proxy geometries encode surface light field associated with the object in the image content, the surface light field including specular reflections associated with the object. In some implementations, the plurality of neural textures are based, at least in part, on the pose, the neural texture being generated by identifying a category of the object, generating a feature map based on the identified category of the object, providing the feature map to a neural network, and generating the neural texture based on a latent code associated with each instance of the identified category and a view associated with the pose. In some implementations, at least a portion of the object is a transparent material. In some implementations, at least a portion of the object is a reflective material.

In some implementations, the image content includes telepresence image data including at least a user and the object includes a pair of eyeglasses. In some implementations, the neural renderer uses a generative model to reconstruct unseen object instances within the identified category, the reconstruction based on less than four captured views of the object. In some implementations, the composite image is generated using a Generative Latent Optimization (GLO) framework and perceptual reconstruction losses.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
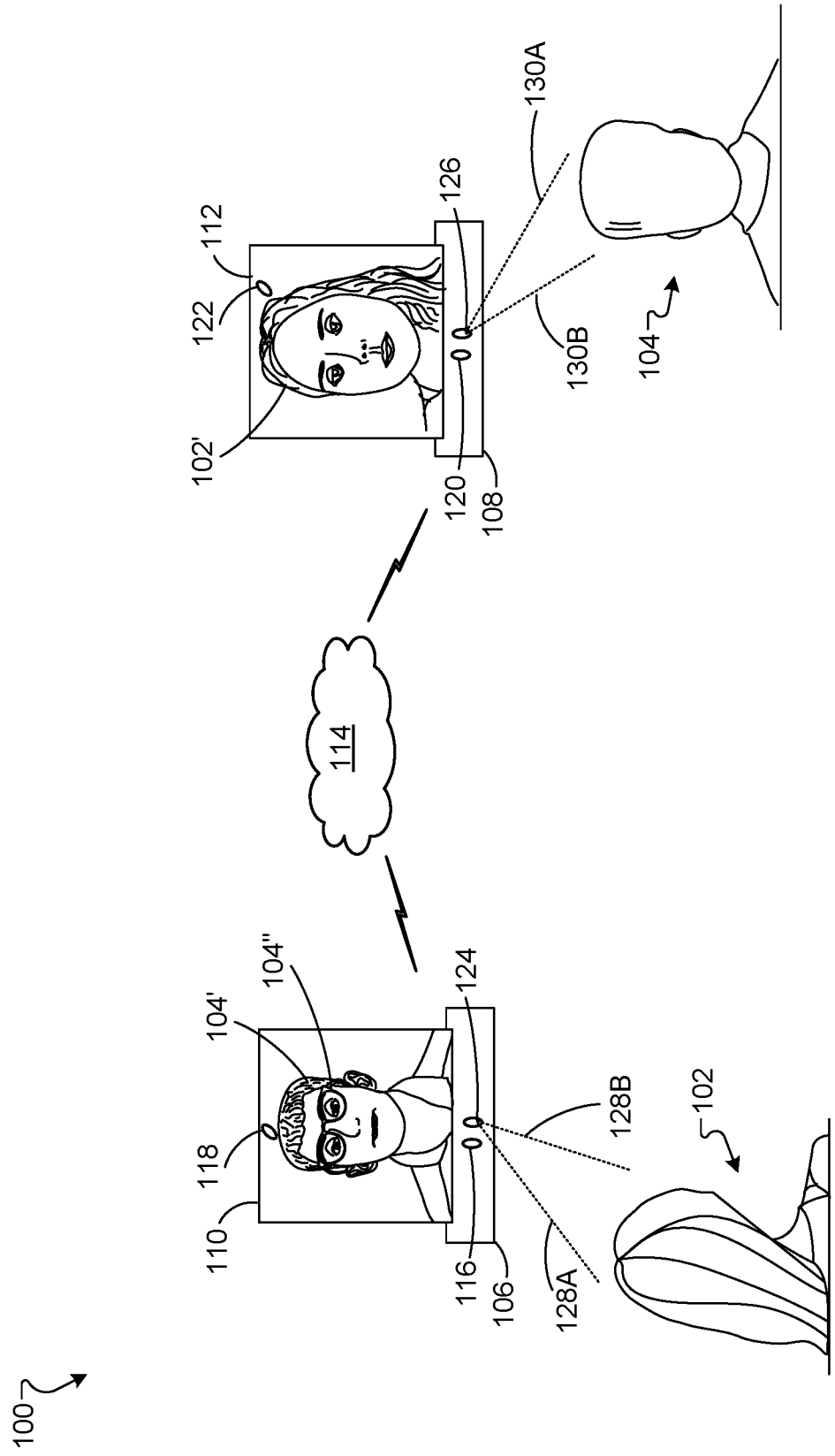
FIG. 1 is a block diagram illustrating an example 3D content system for displaying content on a display device, according to implementations described throughout this disclosure.

Accurate modeling and representation of 3D objects can be challenging when the objects exhibit features such as transparent surfaces, reflective surfaces and/or thin structures. The systems and techniques described herein may provide a way to use 3D proxy geometries (e.g., textured proxies) to model 3D objects with such features to enable accurate rendering of the 3D objects on a screen of a 2D or an autostereoscopic display (e.g., a 3D display). In some implementations, the 3D proxy geometries are based on geometry interpolation of shapes that construct an object within image content.

In general, this document describes examples related to modeling a shape and appearance of a category of objects in order to render accurate images depicting 3D objects. In some implementations, the models described herein can be used to simulate camera-captured objects in a realistic and 3D manner on a screen of a 3D display used in a multi-way videoconference, for example. In some implementations, the objects may be synthetically-generated objects to provide virtual or augmented content within a 3D-generated scene. In some implementations, the objects may be synthetically modified to create randomness and/or realism for a 2D or 3D scene. For example, the models described herein can be used to generate and display objects that are composed of complex shapes and appearances, some of which may include transparent properties, reflective properties, complex geometries, and/or other structural properties that may, conventionally, be difficult to depict in a 3D manner.

As an example, conventional display systems may not accurately render complex objects (e.g., eyeglasses, jewelry, reflective clothing, etc.) on a user captured for display in 3D because transparent and/or reflective materials are difficult to reconstruct and render in a 3D manner. The systems and techniques described herein can generate one or more models of particular physical, lighting, and shading aspects of objects (e.g., such as eyeglasses, jewelry, reflective clothing, and/or non-user related objects) in order to depict the objects in an accurate 3D representation that provides realistic object depiction on a 3D display. In operation, the systems described herein may perform such modeling in real time as the object is captured for rendering in the 3D display. In some implementations, the systems described herein may perform such modeling and rendering while the user is moving with and/or near the object (i.e., wearing or interacting with the object) during use of the 3D display. In some implementations, the systems described herein may perform such modeling on other categories of objects including, but not limited to, vehicle parts, painted surfaces, transparent objects, objects holding liquids, etc. Such objects can be rendered to appear realistic in 3D using the modeling and techniques described herein.

In some implementations, the systems and techniques described herein generate models to represent a general shape and appearance of a category of objects using approximate geometry to generate 3D proxy geometries. As used herein, 3D proxy geometries (textured proxies) represent both a coarse geometry approximation of a set of objects and a latent texture of one or more of the objects mapped to the respective object geometry. The coarse geometry and the mapped latent texture may be used to generate images of one or more objects in the category of objects. For example, the systems and techniques described herein can generate an object for 3D telepresence display by rendering the latent texture onto a target viewpoint and accessing a neural rendering network (e.g., a differential deferred rendering neural network) to generate the target image on the display. To learn such a latent texture, the systems described herein can learn a low-dimensional latent space of neural textures and a shared deferred neural rendering network. The latent space encompasses all instances of a class of objects and allows for interpolation of instances of the objects, which may enable reconstruction of an instance of the object from few viewpoints.

To generate the proxies' textures, the systems and techniques described herein learn a joint latent space using category-level appearance and geometry interpolation. For example, if the object is earrings, a particular dataset may be selected that includes material reflectivity (e.g., for gold, silver, plastic, resin, etc.), earring shapes, etc. The proxies may be independently rasterized with their corresponding neural texture and composited using a neural network (e.g., a U-Net), generating a photorealistic image and an alpha channel (e.g., map, mask, etc.) as output. Using the 3D proxy geometries, complex objects may be reconstructed from a sparse set of views (e.g., fewer than four input images).

In some implementations, the systems and techniques described herein may assess how to display image content captured by a camera for rendering on a 3D display in response to detecting movement of the user accessing the display. For example, if the user (or head or eye of a user) moves left or right, the systems and techniques described herein can detect such movements to model particular objects within the image capture to determine how to display the objects (e.g. image content, users, etc.) in a way that provides 3D depth, proper parallax, and 3D perception of the objects for the user of the 3D display. In addition, the systems and techniques described herein can be used to provide the same 3D depth, parallax and perception of the objects for other users viewing the objects on other 3D displays, for example.

FIG. 1 is a block diagram illustrating an example 3D content system 100 for displaying content in a stereoscopic display device, according to implementations described throughout this disclosure. The 3D content system 100 can be used by multiple users to, for example, conduct video-conference communications in 3D (e.g., telepresence sessions). In general, the system of FIG. 1 may be used to capture video and/or images of users during a videoconference and use the systems and techniques described herein to model a shape and appearance of 3D objects (e.g., eyeglasses, jewelry, etc.) in order to render accurate images depicting the 3D objects within the video conference session. System 100 may benefit from the use of the models described herein because such models can generate and display objects, within a video conference for example, that are composed of complex shapes and appearances, some of which may include transparent properties, reflective properties, complex geometries, and/or other structural properties that may, conventionally, be difficult to depict in a 3D manner.

As shown in FIG. 1, the 3D content system 100 is being used by a first user 102 and a second user 104. For example, the users 102 and 104 are using the 3D content system 100 to engage in a 3D telepresence session. In such an example, the 3D content system 100 can allow each of the users 102 and 104 to see a highly realistic and visually congruent representation of the other, thereby facilitating the users to interact in a manner similar to being in the physical presence of each other.

Each user 102, 104 can have a corresponding 3D system. Here, the user 102 has a 3D system 106 and the user 104 has a 3D system 108. The 3D systems 106, 108 can provide functionality relating to 3D content, including, but not limited to: capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIGS. 2, 4, and 9.

Figure 7:
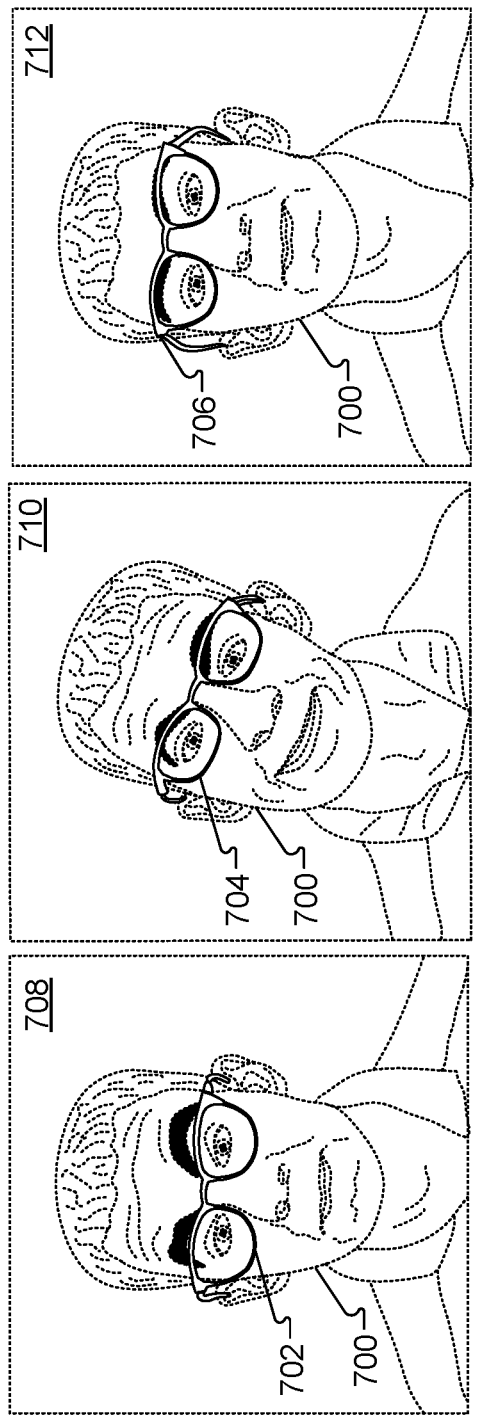
FIGS. 7A-7C illustrate an example virtual try on application using the models described herein, according to implementations described throughout this disclosure.

The 3D content system 100 can include one or more 2D or 3D displays. Here, a 3D display 110 is provided for the 3D system 106, and a 3D display 112 is provided for the 3D system 108. The 3D displays 110, 112 can use any of multiple types of 3D display technology to provide an autostereoscopic view for the respective viewer (here, the user 102 or user 104, for example). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, etc.). In some implementations, displays 110, 112 may be 2D displays, as shown in FIGS. 7A-7C.

In general, 3D displays, such as displays 110, 112 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some implementations, the displays 110, 112 can include a high-resolution and glasses-free lenticular three-dimensional display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example 3D displays, there may be a single location that provides a 3D view of image content (e.g., users, objects, etc.) provided by such displays. A user may be seated in the single location to experience proper parallax, little distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax, low rates of distortion, and realistic 3D images in real time. Thus, the systems and techniques described herein provide the advantage of maintaining and providing 3D image content an objects for display to a user regardless of any user movement that occurs while the user is viewing the 3D display.

As shown in FIG. 1, the 3D content system 100 can be connected to one or more networks. Here, a network 114 is connected to the 3D system 106 and to the 3D system 108. The network 114 can be a publicly available network (e.g., the Internet), or a private network, to name just two examples. The network 114 can be wired, or wireless, or a combination of the two. The network 114 can include, or make use of, one or more other devices or systems, including, but not limited to, one or more servers (not shown).

The 3D systems 106, 108 can include multiple components relating to the capture, processing, transmission or reception of 3D information, and/or to the presentation of 3D content. The 3D systems 106, 108 can include one or more cameras for capturing image content for images to be included in a 3D presentation. Here, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). The cameras 116 and 118 can be positioned and/or oriented so as to capture a sufficiently representative view of a user (e.g., user 102). While the cameras 116 and 118 generally will not obscure the view of the 3D display 110 for the user 102, the placement of the cameras 116 and 118 can be arbitrarily selected. For example, one of the cameras 116, 118 can be positioned somewhere above the face of the user 102 and the other can be positioned somewhere below the face. For example, one of the cameras 116, 118 can be positioned somewhere to the right of the face of the user 102 and the other can be positioned somewhere to the left of the face. The 3D system 108 can in an analogous way include cameras 120 and 122, for example. Additional cameras are possible. For example, a third camera may be placed near or behind display 110.

The 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124. In an analogous way, the 3D system 108 can include a depth sensor 126. Any of multiple types of depth sensing or depth capture can be used for generating depth data. In some implementations, an assisted-stereo depth capture is performed. The scene can be illuminated using dots of lights, and stereo-matching can be performed between two respective cameras, for example. This illumination can be done using waves of a selected wavelength or range of wavelengths. For example, infrared (IR) light can be used. In some implementations, depth sensors may not be utilized when generating views on 2D devices, for example. Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known, and can be used for correlating the images from the camera (s) with signals from the depth sensor to generate depth data for the images.

The images captured by the 3D content system 100 can be processed and thereafter displayed as a 3D presentation. As depicted in the example of FIG. 1, 3D image 104' with object (eyeglasses 104") are presented on the 3D display 110. As such, the user 102 can perceive the 3D image 104' and eyeglasses 104" as a 3D representation of the user 104, who may be remotely located from the user 102. 3D image 102' is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others.

Figure 2:
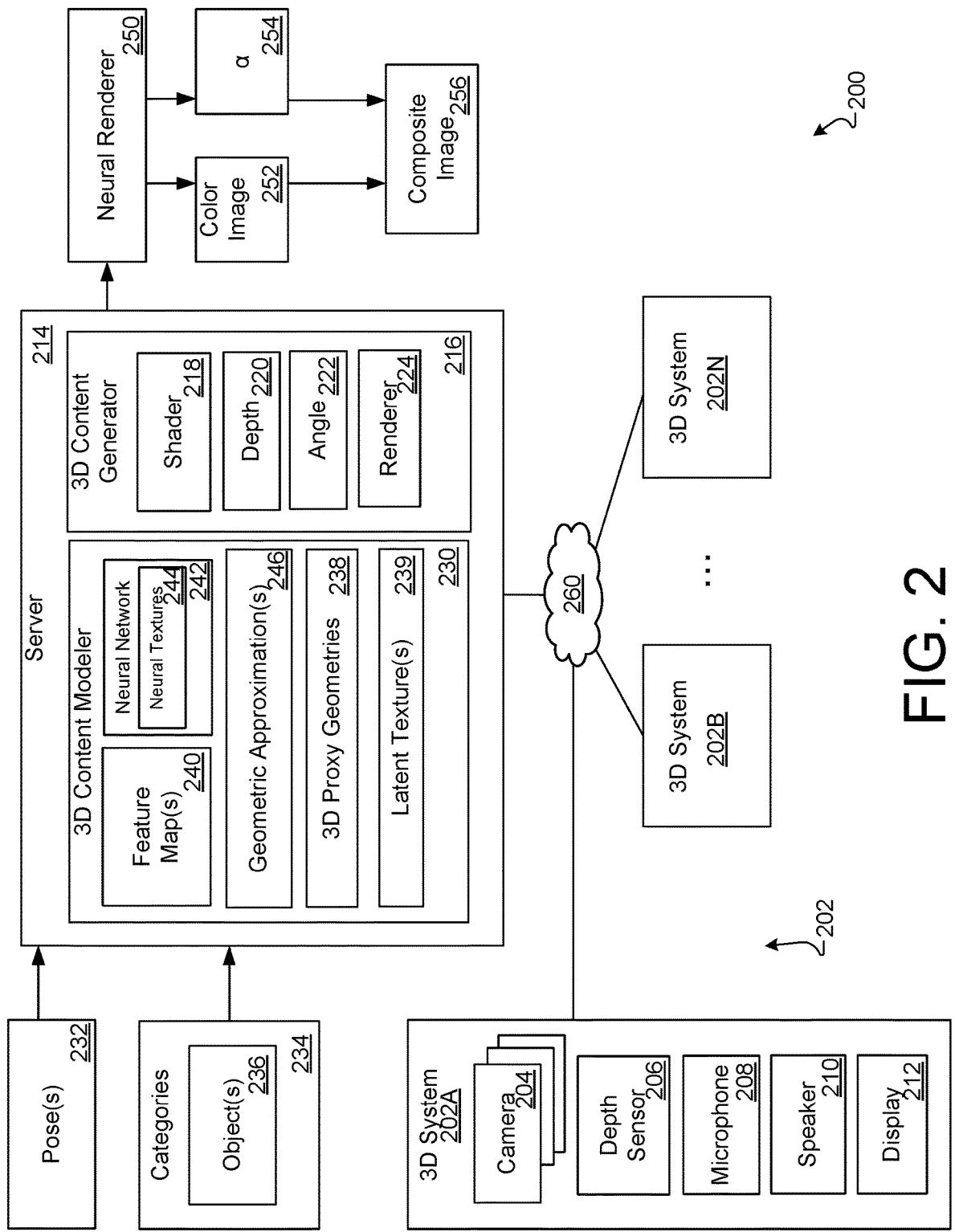
FIG. 2 is a block diagram of an example system for modeling content for render in a display device, according to implementations described throughout this disclosure.

FIG. 2 is a block diagram of an example system 200 for modeling content for render in a 3D display device, according to implementations described throughout this disclosure. The system 200 can serve as or be included within one or more implementations described herein, and/or can be used to perform the operation(s) of one or more examples of 3D processing, modeling, or presentation described herein. The overall system 200 and/or one or more of its individual components, can be implemented according to one or more examples described herein.

The system 200 includes one or more 3D systems 202. In the depicted example, 3D systems 202A, 202B through 202N are shown, where the index N indicates an arbitrary number. The 3D system 202 can provide for capturing of visual and audio information for a 3D presentation, and forward the 3D information for processing. Such 3D information can include images of a scene, depth data about the scene, and audio from the scene. For example, the 3D system 202 can serve as, or be included within, the 3D system 106 and 3D display 110 (FIG. 1).

The system 200 may include multiple cameras, as indicated by cameras 204. Any type of light-sensing technology can be used for capturing images, such as the types of images sensors used in common digital cameras. The cameras 204 can be of the same type or different types. Camera locations may be placed within any location on a 3D system such as 3D system 106, for example.

The system 202A includes a depth sensor 206. In some implementations, the depth sensor 206 operates by way of propagating IR signals onto the scene and detecting the responding signals. For example, the depth sensor 206 can generate and/or detect the beams 128A-B and/or 130A-B.

The system 202A also includes at least one microphone 208 and a speaker 210. For example, these can be integrated into a head-mounted display worn by the user. In some implementations, the microphone 208 and speaker 210 may be part of 3D system 106 and may not be part of a head-mounted display.

The system 202 additionally includes a 3D display 212 that can present 3D images in a stereoscopic fashion. In some implementations, the 3D display 212 can be a stand-alone display and in some other implementations the 3D display 212 can be included in a head-mounted display unit configured to be worn by a user to experience a 3D presentation. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 200 can include a server 214 that can perform certain tasks of data processing, data modeling, data coordination, and/or data transmission. The server 214 and/or components thereof can include some or all components described with reference to FIG. 9.

The server 214 includes a 3D content generator 216 that can be responsible for rendering 3D information in one or more ways. This can include receiving 3D content (e.g., from the 3D system 202A), processing the 3D content and/or forwarding the (processed) 3D content to another participant (e.g., to another of the 3D systems 202).

Some aspects of the functions performed by the 3D content generator 216 can be implemented for performance by a shader 218. The shader 218 can be responsible for applying shading regarding certain portions of images, and also performing other services relating to images that have been, or are to be, provided with shading. For example, the shader 218 can be utilized to counteract or hide some artifacts that may otherwise be generated by the 3D system (s) 202.

Shading refers to one or more parameters that define the appearance of image content, including, but not limited to, the color of an object, surface, and/or a polygon in an image. In some implementations, shading can be applied to, or adjusted for, one or more portions of image content to change how those image content portion(s) will appear to a viewer. For example, shading can be applied/adjusted in order to make the image content portion(s) darker, lighter, transparent, etc.

The 3D content generator 216 can include a depth processing component 220. In some implementations, the depth processing component 220 can apply shading (e.g., darker, lighter, transparent, etc.) to image content based on one or more depth values associated with that content and based on one or more received inputs (e.g., content model input).

The 3D content generator 216 can include an angle processing component 222. In some implementations, the angle processing component 222 can apply shading to image content based on that content's orientation (e.g., angle) with respect to a camera capturing the image content. For example, shading can be applied to content that faces away from the camera angle at an angle above a predetermined threshold degree. This can allow the angle processing component 222 to cause brightness to be reduced and faded out as a surface turns away from the camera, to name just one example.

The 3D content generator 216 includes a renderer module 224. The renderer module 224 may render content to one or more 3D system(s) 202. The renderer module 224 may, for example, render an output/composite image which may be displayed in systems 202, for example.

As shown in FIG. 2, the server 214 also includes a 3D content modeler 230 that can be responsible for modeling 3D information in one or more ways. This can include receiving 3D content (e.g., from the 3D system 202A), processing the 3D content and/or forwarding the (processed) 3D content to another participant (e.g., to another of the 3D systems 202). The 3D content modeler 230 may utilize architecture 400 to model objects, as described in further detail below.

Poses 232 may represent a pose associated with captured content (e.g., objects, scenes, etc.). In some implementations, the poses 232 may be detected and/or otherwise determined by a tracking system (not shown) associated with system 100 and/or 200. Such a tracking system may include sensors, cameras, detectors, and/or markers to track a location of all or a portion of a user. In some implementations, the tracking system may track a location of the user in a room. In some implementations, the tracking system may track a location of the eyes of the user. In some implementations, the tracking system may track a location of the head of the user.

In some implementations, the tracking system may track a location of the user (or location of the eyes or head of the user) with respect to a display device 212, for example, in order to display images with proper depth and parallax. In some implementations, a head location associated with the user may be detected and used as a direction for simultaneously projecting images to the user of the display device 212 via the microlenses (not shown), for example.

Categories 234 may represent a classification for particular objects 236. For example, a category 234 may be eyeglasses and an object may be blue eyeglasses, clear eyeglasses, round eyeglasses, etc. Any category and object may be represented by the models described herein. The category 234 may be used as a basis in which to train generative models on objects 236. In some implementations, the category 234 may represent a dataset that can be used to synthetically render a 3D object category under different viewpoints giving access to a set of ground truth poses, color space images, and masks for multiple objects of the same category.

Three-dimensional (3D) proxy geometries 238 represent both a (coarse) geometry approximation of a set of objects and a latent texture 239 of one or more of the objects mapped to the respective object geometry. The coarse geometry and the mapped latent texture 239 may be used to generate images of one or more objects in the category of objects. For example, the systems and techniques described herein can generate an object for 3D telepresence display by rendering the latent texture 239 onto a target viewpoint and accessing a neural rendering network (e.g., a differential deferred rendering neural network) to generate the target image on the display. To learn such a latent texture 239, the systems described herein can learn a low-dimensional latent space of neural textures and a shared deferred neural rendering network. The latent space encompasses all instances of a class of objects and allows for interpolation of instances of the objects, which may enable reconstruction of an instance of the object from few viewpoints.

Neural textures 244 represent learned feature maps 240 which are trained as part of an image capture process. For example, when an object is captured, a neural texture 244 may be generated using the feature map 240 and a 3D proxy geometry 238 for the object. In operation, system 200 may generate and store the neural texture 244 for a particular object (or scene) as a map on top of a 3D proxy geometry 238 for that object. For example, neural textures may be generated based on a latent code associated with each instance of the identified category and a view associated with the pose.

Geometric approximations 246 may represent a shaped-based proxy for an object geometry. Geometric approximations 246 may be mesh-based, shape-based (e.g., triangular, rhomboidal, square, etc.), free form versions of an object.

The neural renderer 250 may generate an intermediate representation of an object and/or scene, for example, that utilizes a neural network to render. Neural textures 244 may be used to jointly learn features on a texture map (e.g., feature map 240) along with a 5-layer U-Net, such as neural network 242 operating with neural renderer 250. The neural renderer 250 may incorporate view dependent effects by modelling the difference between true appearance (e.g., a ground truth) and a diffuse reprojection with an object-specific convolutional network, for example. Such effects may be difficult to predict based on scene knowledge and as such, GAN-based loss functions may be used to render realistic output.

The RGB color channel 252 (e.g., color image) represents three output channels. For example, the three output channels may include (i.e., a red color channel, a green color channel, and a blue color channel (e.g., RGB) representing a color image. In some implementations In some implementations, the color channel 252 may be a YUV map indicating which colors are to be rendered for a particular image. In some implementations, the color channel 252 may be a CIE map. In some implementations, the color channel 252 may be an ITP map.

Alpha ($\alpha$) 254 represents an output channel (e.g., a mask) that represents for any number of pixels in the object, how particular pixel colors are to be merged with other pixels when overlaid. In some implementations, the alpha 254 represents a mask that defines a level of transparency (e.g., semi transparency, opacity, etc.) of an object.

The exemplary components above are here described as being implemented in the server 214, which can communicate with one or more of the 3D systems 202 by way of a network 260 (which can be similar or identical to the network 114 in FIG. 1). In some implementations, the 3D content generator 216 and/or the components thereof, can instead or in addition be implemented in some or all of the 3D systems 202. For example, the above-described modeling and/or processing can be performed by the system that originates the 3D information before forwarding the 3D information to one or more receiving systems. As another example, an originating system can forward images, modeling data, depth data and/or corresponding information to one or more receiving systems, which can perform the above-described processing. Combinations of these approaches can be used.

As such, the system 200 is an example of a system that includes cameras (e.g., the cameras 204), a depth sensor (e.g., the depth sensor 206), and a 3D content generator (e.g., the 3D content generator 216) having a processor executing instructions stored in a memory. Such instructions can cause the processor to identify, using depth data included in 3D information (e.g., by way of the depth processing component 220), image content in images of a scene included in the 3D information. The image content can be identified as being associated with a depth value that satisfies a criterion. The processor can generate modified 3D information by applying a model generated by 3D content modeler 230 which may be provided to 3D content generator 216 to properly depict the composite image 256, for example.

The composite image 256 represents a 3D stereoscopic image of a particular object 236 with proper parallax and viewing configuration for both eyes associated with the user accessing a display (e.g., display 212) based at least in part on a tracked location of the head of the user. At least a portion of the composite image 256 may be determined based on output from 3D content modeler 230, for example, using system 200 each time the user moves a head position while viewing the display. In some implementations, the composite image 256 represents the object 236 and other objects, users, or image content within a view capturing the object 236.

In some implementations, processors (not shown) of systems 202 and 214 may include (or communicate with) a graphics processing unit (GPU). In operation, the processors may include (or have access to memory, storage, and other processor (e.g., a CPU)). To facilitate graphics and image generation, the processors may communicate with the GPU to display images on a display device (e.g., display device 212). The CPU and the GPU may be connected through a high speed bus, such as PCI, AGP or PCI-Express. The GPU may be connected to the display through another high speed interface such as HDMI, DVI, or Display Port. In general, the GPU may render image content in a pixel form. The display device 212 may receive image content from the GPU and may display the image content on a display screen.

Figure 3:
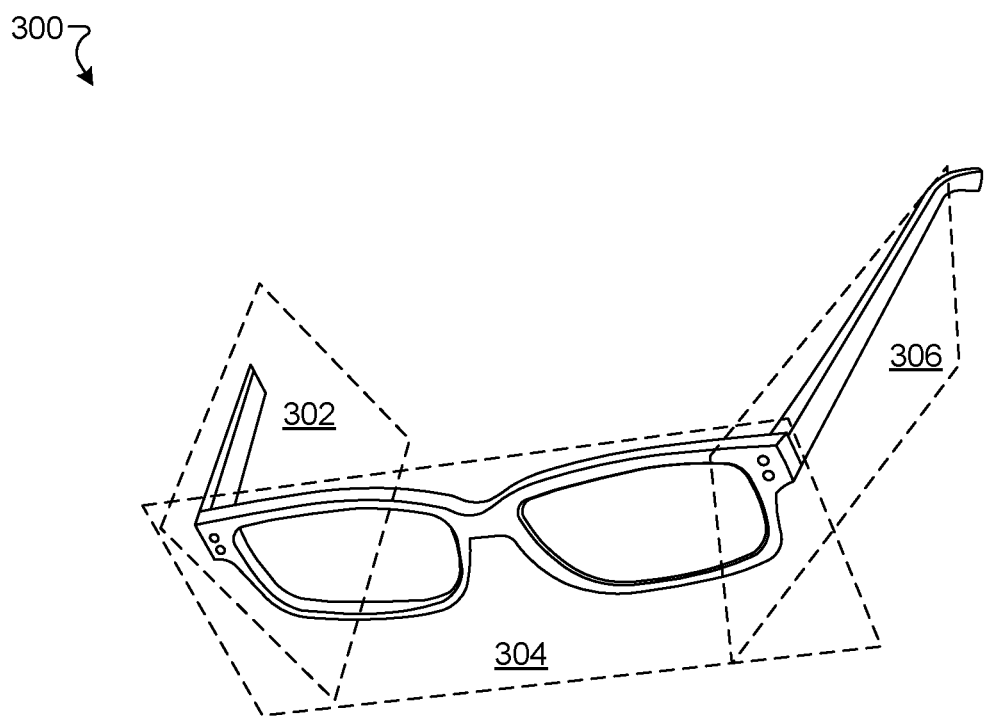
FIG. 3 is a diagram depicting example planar proxies for categories of objects with well-bounded geometric variations, according to implementations described throughout this disclosure.

FIG. 3 is a diagram depicting example planar proxies for categories of objects with well-bounded geometric variations, according to implementations described throughout this disclosure. For example a planar proxy 302 is depicted as a left side of a pair of eyeglasses 300. The planar proxy 302 represents a planar billboard modeling the left side of the eyeglasses 300. Similarly, a planar proxy 304 is shown to represent a center portion (e.g., front portion) of the eyeglasses while a planar proxy 306 represents a right side of the eyeglasses 300. The eyeglasses 300 represent an example of an object. Other objects and planar proxy shapes representing such objects may be utilized by the systems and techniques described herein to generate and render 3D content. For example, other proxies may include, but are not limited to a box, a cylinder, a sphere, a triangle, etc.

A planar proxy may represent a texture-mapped object (or portion of an object) that may be used as a substitute for complex geometry. Because manipulating and rendering geometric proxies is less computationally intensive than manipulating and rendering corresponding detailed geometry, the planar proxy representations may provide a simpler shape in which to reconstruct a view. The planar proxy representation may be used to generate such a view. The use of a planar proxy may provide an advantage of a low computational cost when attempting to manipulate, reconstruct, and/or render objects with highly complex appearance such as eyeglasses, cars, clouds, trees, and grass, just to name a few examples. Similarly, with the availability of powerful graphics processing units, real time game engines offer can use such proxies (e.g., geometric representations) with multiple levels of detail that can be swapped in and out with distance, using 3D proxy geometries to generate maps to supplant geometry at lower levels of detail.

In operation, the system 200 may generate planar proxies 302-304 by computing a bounding box (e.g., a coarse visual hull) for each object using extracted alpha masks. In general, the alpha masks represent, for any number of pixels in the object, how particular pixel colors are to be merged with other pixels when overlaid. The system 200 may then specify a region of interest in the image of the eyeglasses. The region of interest may be specified using head coordinates. The system 200 may then extract a plane that probabilistically matches the surface as viewed from a corresponding orthographic projection. In this example, the planes used to generate the proxies 302-304 are a right view, a center view, and a left view to depict the three sides of the eyeglasses.

In general, the system 200 may generate planar proxies for any number of images, which may be used as training data that is input to a neural network. The neural network may determine how to properly display particular objects (e.g., pairs of eyeglasses) captured by a camera, for example. Thus, each pair of eyeglasses used as training data input to the neural network may be associated with a unique proxy geometry. In some implementations, at training time, the system 200 may detect a pose of the object in an image. In some implementations, the system 200 may generate a view of a particular object by assembling a dataset of images with the object and using the detected pose to simulate the object from a viewpoint based on the pose.

In some implementations, the system 200 may build a latent space of eyeglasses and feed the latent space of eyeglasses to NN 242, for example, which may then generate a texture map for the eyeglasses. In some implementations, the system 200 may reduce a number of instances of planar proxies out of the training data to execute few-shot reconstruction while using the remaining planar proxies to train a category-level model for the neural network. For example, the remaining planar proxies representing eyeglass images can be used to train an eyeglasses category (e.g., categories 234) for the neural network 242.

Any number of categories of objects can be trained for use with NN 242. For example, the system 200 can train latent 3D proxy geometries using cars, live plants, and/or other categories of objects that may be thin, reflective, transparent, and/or otherwise difficult to accurately model and render in 3D. For example, the system 200 may model cares using free form 3D proxy geometries and/or geometric meshes based on sampling a number of car objects.

In another example, thin objects such as x-ray films, camera negatives, or other film that may be backlit for display on 2D or 3D video, can be captured. The systems and techniques described herein may employ planar proxies to properly depict and/or correct image content within the film such that the film (e.g., x-ray, etc.) is properly conveyed to a user viewing the 2D or 3D video.

Figure 4:
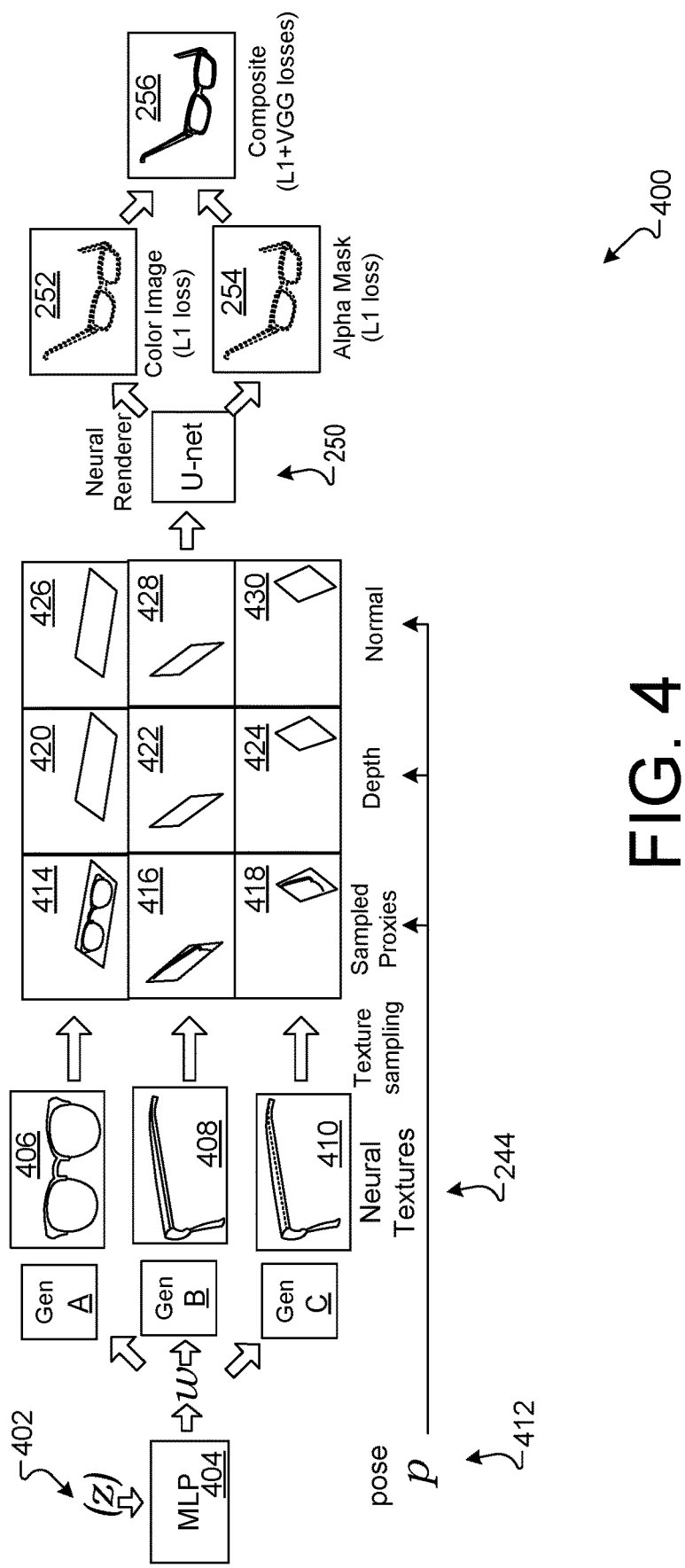
FIG. 4 is a block diagram of example network architecture trained by a generative latent optimization framework, according to implementations described throughout this disclosure.

FIG. 4 is a block diagram of example network architecture 400 trained by a generative latent optimization framework, according to implementations described throughout this disclosure. In general, the architecture 400 is an example of utilizing system 200 to use 3D proxy geometries P to parameterize neural textures using a generative model that can produce a variety of shapes and appearances of objects. An example using eyeglasses as the example object to be modeled is depicted. However, any object or object category may be substituted and used in the architecture 400 in order to model and generate 3D image content.

As shown in FIG. 4, a collection of objects is generated as a map (z) 402, which represents a latent code for each object instance i as $z_i \in R^n$. The map (z) 402 of latent space may be an eight dimensional (8D) map. The map 402 may include random values that are optimized using architecture 400.

In operation of architecture 400 (e.g., using system 200), the map (z) 402 is provided to a multilayer perceptron (MLP) neural network 404 (e.g., NN 242) to generate a number of neural textures 244, which are depicted in this example as neural texture 406, neural texture 408, and neural texture 410. The neural textures 406-410 may represent portions of a mesh that define some portion of geometry and/or texture for a particular object represented in map (z) 402.

The MLP NN 404 (e.g., NN 242) may lift the elements represented in the 8D map to a higher dimensional space (e.g., 512 dimensions). The architecture 400 utilizes a pose 412 associated with a captured image (e.g., a pose of the proxy generated from a captured image) to generate the neural textures 406-408, samples 414, 416, and 418, and corresponding depths 420, 422, 424, as well as corresponding normal viewpoint 426, 428, and 430.

Given a collection of objects of a particular class, the system 200 defines a latent code for each instance i as $z_i \in R^n$. The models described herein and utilized by architecture 400 may generate and use a coarse geometry that includes a set of K proxies $\{P_{i,1}, \ldots, P_{i,K}\}$ (i.e., triangular meshes with U-V coordinates). For example, the architecture 400 may project a 2D image to a 3D proxy model surface in order to generate the neural textures 406-408. The U-V coordinates denote the axes of the 2D texture. The proxies function to represent a version of the actual geometry of any or all of the collection of objects in the class. The architecture 400 can compute (e.g., generate) a neural texture $T_{i,j} = Gen_j(w_i)$ for each instance of the object and each represented 3D proxy geometry, where $w_i = MLP(z_i)$ is a non-linear re-parameterization of the latent code $z_i$ using the MLP NN 404.

Image generator A, B, and C may (e.g., Gen(.)) may represent decoders that receive a latent code (e.g., map (z) 402) as input in order to generate a feature map using the neural textures 406-410, for example. To render an output view, the architecture 400 may rasterize a deferred shading buffer from each proxy including the depth, normal and UV coordinates. The architecture 400 may then sample the corresponding neural texture(s) 406, 408, and 410, for example, using the shading buffer U-V coordinates (not shown) for each proxy. The result of the sampling is shown at 414, 416, and 418.

The architecture 400 may use the contents of the shading buffers as input to the neural renderer 250 (e.g., a U-Net). The neural renderer 250 may generate four output channels. For example, the neural renderer 250 may generate color space/color channels 252 representing three output channels (i.e., a red color channel, a green color channel, and a blue color channel). In some implementations, the color channel 252 may be a color image (e.g., mapping) indicating which colors are to be rendered in the image. The fourth output channel may be an alpha channel 254 that represents a mask for a particular object that specifies how each pixel should be merged with another pixel represented in the object when the two pixels are overlaid on top of one another. In an example, the alpha channel (e.g., mask) may represent an opacity of a pair of eyeglasses. That is, the alpha mask may represent a semi-transparency of a particular geometry or surface of an object.

In some implementations, the plurality of neural textures are configured to reconstruct a hidden portion of the object captured in the image content. For example, in the view of eyeglasses 406, a portion of a bow of the glasses may be hidden because the front view of the glasses hides the bow. The hidden portion (e.g., the bow) may be reconstructed based on the stacked formation of the neural textures (e.g., on top of each other) which may enable the neural renderer to generate (e.g., represent) transparent layers of the object and surfaces behind the transparent layers of the object.

In some implementations, color values may be pre-multiplied by the alpha channel 254 (e.g., mask) because color in pixels with low alpha values tend to be particularly noisy in the extracted mattes of the image, which may distract the NN 404 (e.g., NN 242). The color channel 252 and the alpha channel 254 may be combined to generate and render a composite image 256.

In some implementations, an L1 loss can be calculated by architecture 400 for both the color channel 252 and the alpha channel 254. In some implementations, the L1 loss may be calculated by architecture 400. In some implementations, the VGG losses may also be calculated for the composite image 256 to account for any perceptual loss in the generated composite image 256.

In operation, architecture 400 uses proxy geometry principles to encode a geometric structure using a set of coarse proxy surfaces (e.g., 3D proxy geometries 238) as well as shape, albedo, and view dependent effects using view-dependent neural textures 244. The neural textures 244 are parameterized using a generative model that can generate a variety of shapes and appearances.

For example, the architecture 400 may generate neural textures 244 for 3D proxy geometries 238 generated by system 200. The 3D proxy geometries 238, in general, include portions of mesh that depict a geometry and/or texture associated with an object. Using the pose 412 of a particular 3D proxy geometry, the architecture 400 may render a version of the object from a particular viewpoint. For example, a normal 426, 428, and 430 are generated as a plane representing an object. A depth map 420, 422, and 424 may also be generated for each pixel of the object. In addition, sampled proxies 414, 416, and 418 may be generated to use as a map (e.g., feature map 240) in the 3D proxy geometry to retrieve a particular portion of the geometry to sample and render.

Upon generating elements 414-430, the architecture 400 may stack the images to generate nine channels and may then generate a number of views of the object which may then be concatenated into a deferred shading buffer. The output of the deferred shading buffer may be provided to the neural renderer 250, which generates a color space image 252 and an alpha mask.

In some implementations, architecture 400 utilizes a Generative Latent Optimization (GLO) framework to train the NN 404 end to end using L1 and VGG perceptual reconstruction losses. In some implementations, L1 losses are reconstructed on pre-multiplied color space channel values, pre-multiplied alpha channels, and a composite on a neutral gray background. In some implementations, a perceptual loss may be applied on the composite image 256, for example, using the second and fifth layers of VGG pre-trained on a set of images. In some implementations, the latent codes (e.g., map (z) 402) for each class are randomly initialized and an optimizer with a learning rate of $1e^{-5}$. Neural textures 244 (e.g., 406, 408, and 410) may include neural textures of 9 channels. In some implementations, map (z) 402 may be represented in 8 dimensions and (w) may be represented in 512 dimensions. Image results (e.g., composite images 256 may be generated at 512×512 resolution for eyeglasses, for example. Other resolutions may be utilized for other objects.

Figure 5A:
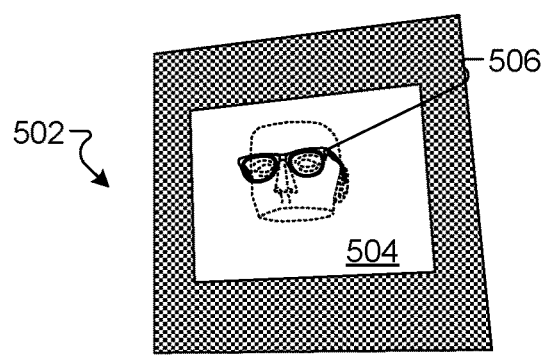
FIGS. 5A-5C illustrate examples of simulating, capturing, and extracting image content, according to implementations described throughout this disclosure.
Figure 5B:
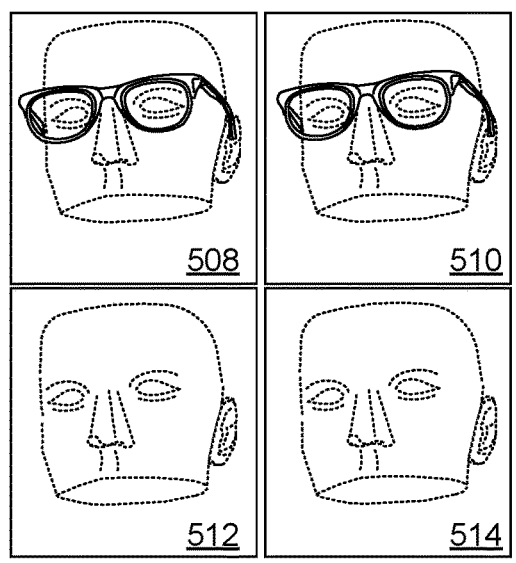
Figure 5C:
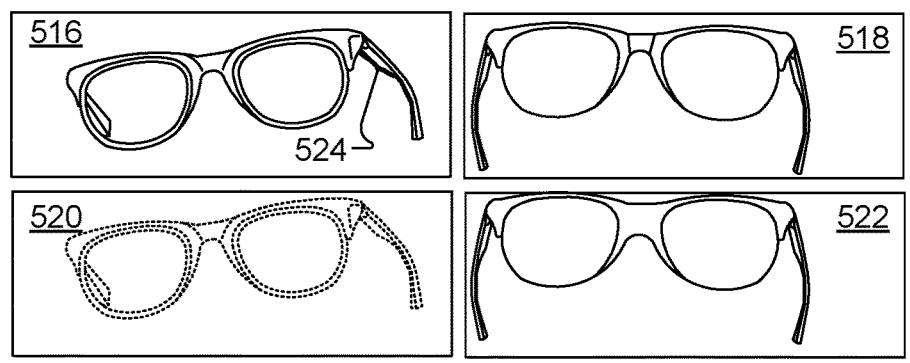

FIGS. 5A-5C illustrate examples of simulating, capturing, and extracting image content, according to implementations described throughout this disclosure. FIG. 5A represents an example apparatus 502 in which to capture images (e.g., image 504 of a user wearing eyeglasses 506. Although apparatus 502 is depicted for capturing eyeglass objects, other apparatuses can be built and used to capture other object categories and to use such captured content to train neural networks and to generate models for the object categories. The apparatus 502 depicts a mannequin head simulating a user with a white background and a Calibu calibration configuration to represent cameras and compute camera geometry as well as photometric model parameters.

FIG. 5B represents an image capture using apparatus 502. Here, four images 508, 510, 512, and 514 are captured to represent a number of poses 412 and object (e.g., eyeglasses 506). If the represented object were cars instead of eyeglasses, a number of images of cars may be captured for this step.

FIG. 5C represents four images 516, 518, 520, and 522 representing possible versions of eyeglasses. For example, the architecture 400 may use images 508-514 to solve for foreground alpha mattes and colors. In some implementations, soft shadows (e.g., shadow 524) of the eyeglasses may remain from the matting algorithm. In this example, the latent transformation MLP 404 has 4 layers of 256 features, and the rendering U-Net (e.g., neural renderer 250) contains 5 down-sampling and up-sampling blocks with two convolutions each (total 20 convolutions).

Figure 6:
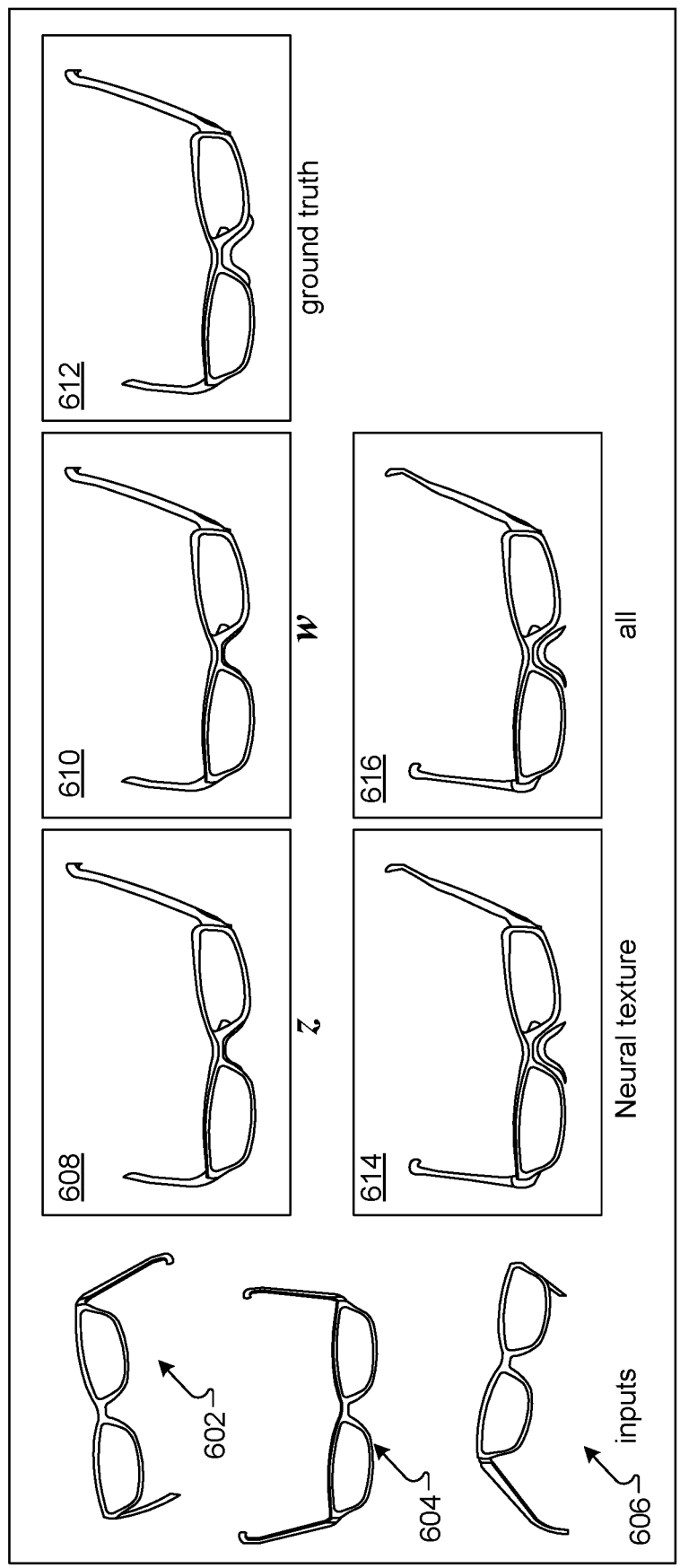
FIG. 6 illustrates example images based on where the models described herein are fit, according to implementations described throughout this disclosure.

FIG. 6 illustrates example images based on where the models described herein are fit, according to implementations described throughout this disclosure. In general, the system 200 may receive a variety of captured input images of an object. In this example, the input images include three images of eyeglasses (e.g., eyeglasses 602, eyeglasses 604, and eyeglasses 606). Interpolated versions of the eyeglasses are shown by example latent code (z) 608, an image (w) 610 representing a nonlinear latent reparameterization of latent code (z) 608, a ground truth image 612, an example neural texture 614 of the image, and a combined image 616 representing a combined version of the image.

FIG. 6 illustrates examples of view interpolation carried out by the systems described herein, as compared to ground truth image content, according to implementations described throughout this disclosure. Although the GLO model is generally described above, other view interpolation models may be used including, but not limited to a Variational Auto Encoder (VAE) model, or a Game Theory (GT) model.

Although particular angles of inputs are provided, other angles of the eyeglasses may be interpolated using few shot reconstruction. For example, left side angle views of the eyeglasses may be provided as inputs, but the system 200 may reconstruct views from a right side angle by fine tuning input views and reconstructing other viewpoints using the neural textures. View dependent effects captured at the bridge of the eyeglasses may also be reconstructed even if not captured in the input images.

The system 200 may employ a generative model that allows interpolations in the latent space of objects, effectively building a deformable model of shape and appearance similar to a 3D morphable model. For example, the system 200 may generate such interpolations where the proxy geometry of the eyeglasses object 604 is kept constant while the latent code (z) 608 is linearly interpolated to generate image (w) 610. Differences may depend upon where the model is being fit. The shape of the eyeglasses object 604 is shown realistically at image (w) 610, although the texture does not match, and improved overall reconstruction is achieved when all network parameters are fine-tuned.

Because the system 200 uses a parameterized space of textures, the system can reconstruct a particular instance by finding the right latent code (z) that reproduces the input views. This can be done through either an encoder, or through optimization by using gradient descent on a reconstruction loss, for example. In some implementations, the system 200 can instead optimize intermediate parameters of the neural networks including, but not limited to optimizing the transformed latent space (w), optimizing the neural texture space, or optimizing all the network parameters (i.e., fine-tuning the entire neural network.

Thus, given a set of views $\{I_1, \ldots, I_k\}$ with corresponding poses $\{p_1 \ldots p_k\}$ and proxy geometry $\{P_{i,1}, \ldots, P_{i,K}\}$, the system 200 may define a new latent code (z) and may set the reconstruction process as the following optimization:

$$z^*\theta^* = \mathrm{argmin} \Sigma_k 1\|I^k - \mathrm{Net}(z, pk.\theta)\|_1 \qquad \text{(Equation 1)}$$

where Net( ) is the end to end network architecture of FIG. 4 parameterized by the latent code (z), the pose (p), and the intermediate network parameters to be optimized (θ). In some implementations, stacking the proxy inputs provides for eyeglass bows to be occluded by a front proxy, but such views can be accurately reproduced using system 200 and architecture 400.

FIGS. 7A-7C illustrate an example virtual try-on application using the models described herein, according to implementations described throughout this disclosure. The generative model utilized by system 200 and architecture 400 can enable an experience of virtually trying on objects. In the depicted example, a user 700 is trying on different eyeglasses 702, 704, and 706, respectively, while being able to move during video/image capture of the user 700 wearing the particular eyeglasses.

The learnt latent space of eyeglasses (performed by system 200 and/or architecture 400) may allow a user to modify the appearance and shape of eyeglasses by modifying the input latent code. The example video image snapshots 708, 710, and 712 illustrate the result of system 200 processing a video of the user 700 at close distance where the user is not wearing eyeglasses. The head pose of the user 700 is tracked by tracking systems of a telepresence device 106, for example. Textured proxies can be placed on the head frame of a reference apparatus (e.g., shown in FIG. 5A). The system 200 can then render the neural proxies to generate a color image and alpha mask representing eyeglasses layers and then may composite such layers onto the frame.

In short, the systems and techniques described herein provide a compact representation for jointly modeling shape and appearance of objects. The systems use coarse proxy geometry and generative latent textures. The systems illustrate that by jointly modeling an object collection, latent interpolations may be performed between seen instances in order to reconstruct unseen instances with high quality with as few as three input images. The systems may assume known 3D proxy geometry and pose.

Figure 8:
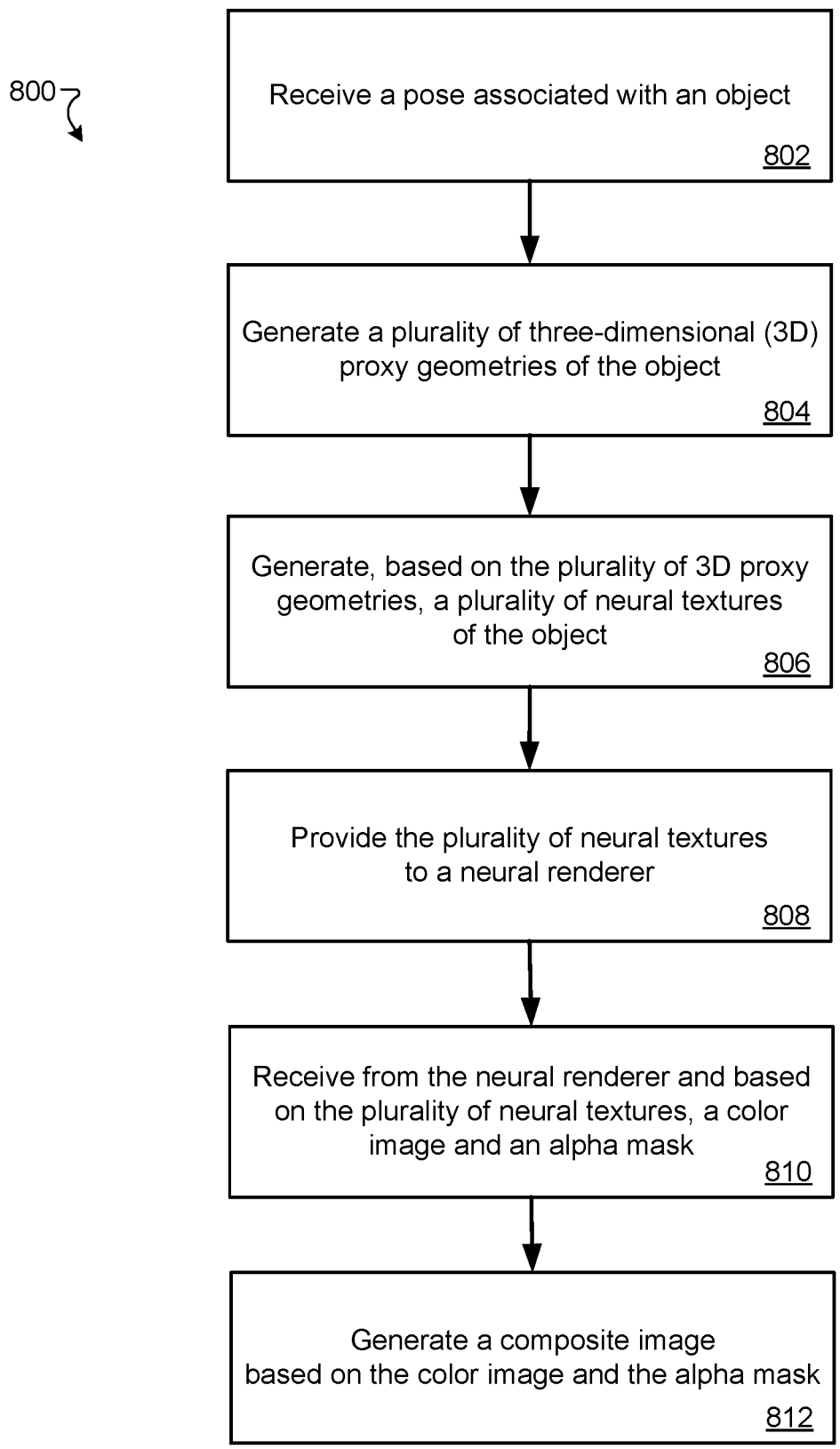
FIG. 8 is a flow chart diagramming one example of a process to generate a composite image based on a 3D proxy geometry model, according to implementations described throughout this disclosure.

FIG. 8 is a flow chart diagramming one example of a process 800 to generate a composite image based on a 3D proxy geometry model, according to implementations described throughout this disclosure. In short, the process 800 may provide an example of using 3D proxy geometries with a generative model to generate accurate representations of 3D object images. The process 800 may utilize at least one processing device and memory storing instructions that when executed cause the processing device to perform the plurality of operations and computer implemented steps described in the claims. In general, the systems 100, 200, and/or architecture 400 may be used in the description of process 800. Each of systems 100, 200, and architecture 400 may, in some implementations, represent a single system.

At block 802, the process 800 includes receiving a pose associated with an object in image content. In some implementations, the pose may be retrieved and/or received based on detecting an object and/or pose from the image content.

For example, the process 800 may detect one or more visual cues associated with an object. The visual cues may trigger particular object detection. For example, the visual cues may include, but are not limited to camera-captured transparent properties, reflective properties, complex geometries, and/or other structural properties in which system 200 determines a match with stored categories 234 and/or objects 236. In some implementations, a pose may be assessed for example, when eyeglasses are worn on an individual being captured by a camera. The pose can provide knowledge of where the user's face is located and thus detection of the eyeglasses can be correlated to the one location of the face. In some implementations, the process 800 may detect an object at inference time when the task is to replace an object already in a scene with a re-rendered variation of the object.

For example, the object may be eyeglasses 104" (FIG. 1). The eyeglasses 104" may be captured by a camera associated with system 108, for example, if user 104 is in a teleconference with user 102. Here, the camera may detect the eyeglasses 104" and may employ system 200 to generate a realistic view of the eyeglasses 104" because a conventional capture of the eyeglasses 104" may not appear accurately based on reflective surfaces and/or transparent surfaces. That is, because objects that are captured in images and/or video may include at least a portion of object material constructed of a transparent material and/or reflective material, the process 800 may use system 200 and/or architecture 400 to correct any representation of the object (eyeglasses 104") to ensure that the object is properly rendered in 3D for display to user 102, for example.

In this example, the image content may include telepresence image data (e.g., as shown in 110) that includes at least a user (e.g., user in image 104') and the object includes the pair of eyeglasses 104". However, other examples may include image content with other objects with reflective, transparent, and/or other difficult surface to re-render in video, for example. In some implementations, the object includes a vehicle portion with reflective properties. The vehicle portion may be reflective and may not appear accurately when re-rendering the view of the vehicle portion within a 3D display, for example. In some implementations, the object includes a portion of any object captured in an image. Accordingly, process 800 may correct errors and render portions of content using the generative models, category-level object modeling techniques, and/or other techniques described herein.

At block 804, the process 800 includes generating a plurality of three-dimensional (3D) proxy geometries 238 of the object. For example, the 3D content modeler 230 may generate 3D proxy geometries 414-430 of the eyeglasses 104" which may represent a normal proxy geometry (426, 428, and 430), a depth map (e.g., 420, 422, 424), and sampled versions of the proxies (e.g., 414, 416, and 418). The sample proxies 414, 416, and 418 may represent an atlas (e.g., feature map 240) of geometry and texture sampling of particular features of the eyeglasses 104". In some implementations, each of the plurality of 3D proxy geometries include a coarse geometric approximation of at least a portion of the object (e.g., eyeglasses 104") and a latent texture 239 of the object (e.g., eyeglasses 104") mapped to the coarse geometry approximation (e.g., geometric approximations 246), which may be represented as planar surfaces 302, 304, and 306.

In some implementations, the plurality of 3D texture proxies encode a surface light field associated with the object in the image content. The surface light field may, for example, include specular reflections associated with the object or other geometry reflection that lies away from a particular proxy surface (e.g., lens reflections, refractions, etc.).

At block 806, the process 800 includes generating, based on the plurality of 3D proxy geometries 238, a plurality of neural textures 244 of the object (e.g., eyeglasses 104"). Here, the neural textures 244 define a plurality of different shapes and appearances representing the object. Neural textures 244 represent at least a portion of learned feature maps 240 which are trained as part of an image capture process. For example, when the eyeglasses object 104" is captured by a camera, a neural texture 244 may be generated using the feature map 240 and a 3D proxy geometry 238 for the object. In operation, system 200 may generate and store the neural texture 244 for a particular object (or scene) as a map on top of a 3D proxy geometry 238 for that object.

At block 808, the process 800 includes providing the plurality of neural textures 244 to a neural renderer 250, the plurality of neural textures being provided in a stacked formation. For example, the system 200 may use the contents of the shading buffers (not shown) as input to the neural renderer 250 (e.g., a U-Net).

In operation, the neural renderer 250 may use the input of the plurality of neural textures to generate an intermediate representation of an object and/or scene, for example, that utilizes a neural network to render. Neural textures 244 may be used to jointly learn features on a texture map (e.g., feature map 240) along with a 5-layer U-Net, such as neural network 242 operating with neural renderer 250. The neural renderer 250 may incorporate view dependent effects by modelling the difference between true appearance (e.g., a ground truth) and a diffuse reprojection with an object-specific convolutional network, for example. Such effects may be difficult to predict based on scene knowledge and as such, GAN-based loss functions may be used to render realistic output.

In some implementations, the object (e.g., eyeglasses 104") is associated with a pose (e.g., pose 412). For example, the pose may be the capture angle of an original scene and may be the desired angle of output for the composite image that the system 200 and process 800 is attempting to generate. In such examples, the plurality of neural textures are based, at least in part, on the pose. In some implementations, the neural textures are generated by identifying a category of the object (e.g., eyeglasses) and generating a feature map based on the identified category of the object (e.g., neural textures 244 are turned into stacked images 414-430). The feature map may be provided to the neural network 242 (which may be part of neural renderer/U-net 250). The neural texture 244 may be generated using the feature map 240 based on a view associated with the pose 412. In some implementations, neural textures may be generated based on a latent code associated with each instance of the identified category and a view associated with the pose.

In some implementations, the neural renderer uses a generative model to reconstruct unseen object instances within the identified category and the reconstruction may be based on less than four (e.g., three views shown by neural textures 406, 408, and 410) captured views of the object (e.g., eyeglasses 104").

At block 810, the process 800 includes receiving, from the neural renderer and based on the plurality of neural textures, a color image 252 and an alpha mask 254 representing an opacity of at least a portion of the object (eyeglasses 104"). For example, the neural renderer 250 may generate four output channels. That is, the neural renderer 250 may generate color space color channels 252 representing three output channels (i.e., a red color channel, a green color channel, and a blue color channel). In some implementations, the color image 252 may represent a color space map indicating which colors are to be rendered for a particular image. The fourth output channel may be an alpha mask 254 that represents a channel for a particular object that specifies how each pixel should be merged with another pixel represented in the object when the two pixels are overlaid on top of one another. In an example, the alpha mask 254 may represent an opacity of a pair of eyeglasses. In general, the alpha mask 254 may represent a semi-transparency of a particular geometry or surface of an object. In operation, process 800 may rasterize the neural textures into final image coordinates using pose and a viewpoint, for example, and may use the neural renderer to process those textures 252/254 into the final image coordinate space of composite image 256.

At block 812, the process 800 includes generating a composite image 256 based on the color image 252 and the alpha mask 256. For example, the process 800 may render the latent texture 239 onto a target viewpoint (e.g., captured by a camera of system 108, for example). The target viewpoint may be based at least in part on a pose 412 associated with the object (eyeglasses 104"). In some implementations, the 3D texture proxy geometries include a coarse geometric approximation of at least a portion of the object and a latent texture of the object mapped to the coarse geometry approximation. Although eyeglasses are described in the example of process 800, any number of objects may instead be substituted and rendered using the techniques of the process 800.

Figure 9:
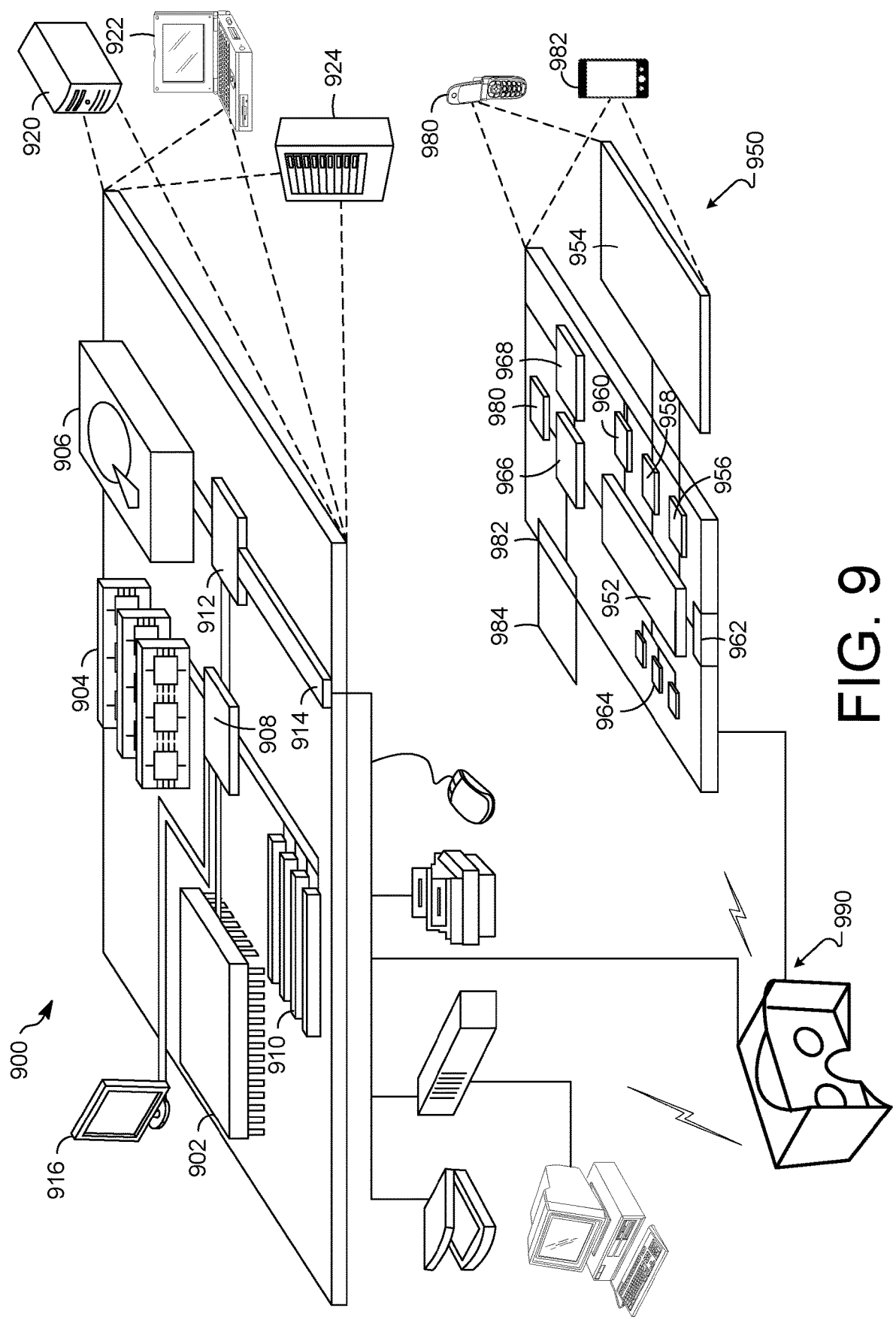
FIG. 9 shows an example of a computer device and a mobile computer device, which may be used with the techniques described herein.

FIG. 9 shows an example of a computer device 900 and a mobile computer device 950, which may be used with the described techniques. Computing device 900 can include a processor 902, memory 904, a storage device 906, a high-speed interface 908 connecting to memory 904 and high-speed expansion ports 910, and a low speed interface 912 connecting to low speed bus 914 and storage device 906. Components 902, 904, 906, 908, 910, and 912, are interconnected using various busses, and can be mounted on a common motherboard or in other manners as appropriate. Processor 902 can process instructions for execution within the computing device 900, including instructions stored in the memory 904 or on storage device 906 to display graphical information for a GUI on an external input/output device, such as display 916 coupled to high speed interface 908. In some embodiments, multiple processors and/or multiple buses can be used, as appropriate, along with multiple memories and types of memory. In addition, multiple computing devices 900 can be connected, with each device providing portions of the necessary operations (e.g., as a server bank, a group of blade servers, or a multi-processor system).

Memory 904 stores information within computing device 900. In one embodiment, memory 904 is a volatile memory unit or units. In another embodiment, memory 904 is a non-volatile memory unit or units. Memory 904 may also be another form of computer-readable medium, such as a magnetic or optical disk.

Storage device 906 can provide mass storage for the computing device 900. In one embodiment, storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 904, storage device 906, or memory on processor 902.

High speed controller 908 manages bandwidth-intensive operations for computing device 900, while low speed controller 912 manages lower bandwidth-intensive operations. Such allocation of functions is exemplary only. In one embodiment, high-speed controller 908 is coupled to memory 904, display 916 (e.g., through a graphics processor or accelerator), and to high-speed expansion ports 910, which may accept various expansion cards (not shown). Low-speed controller 912 can be coupled to storage device 906 and low-speed expansion port 914. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown), such as device 950. Each of such devices may contain one or more of computing device 900, 950, and an entire system may be made up of multiple computing devices 900, 950 communicating with each other.

Computing device 950 includes processor 952, memory 964, an input/output device such as display 954, communication interface 966, and transceiver 968, among other components. Device 950 may also be provided with a storage device, such as a microdrive or other device, to provide additional storage. Each of components 950, 952, 964, 954, 966, and 968, are interconnected using various buses, and several of the components may be mounted on a common motherboard or in other manners as appropriate.

Processor 952 can execute instructions within the computing device 950, including instructions stored in memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to display 954. Display 954 may be, for example, a TFT LCD (Thin-Film-Transistor Liquid Crystal Display) or an OLED (Organic Light Emitting Diode) display, or other appropriate display technology. Display interface 956 may comprise appropriate circuitry for driving display 954 to present graphical and other information to a user. Control interface 958 may receive commands from a user and convert them for submission to processor 952. In addition, external interface 962 may communicate with processor 952, so as to enable near area communication of device 950 with other devices. External interface 962 can provide, for example, for wired or wireless communication in some embodiments multiple interfaces can be used.

Memory 964 stores information within computing device 950. Memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 can be a security module for device 950, and can be programmed with instructions that permit secure use of device 950. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 can communicate wirelessly through communication interface 966, which can include digital signal processing circuitry where necessary. Communication interface 966 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, such as using a Bluetooth, Wi-Fi, or other such transceiver (not shown). In addition, GPS (Global Positioning System) receiver module 980 can provide additional navigation- and location-related wireless data to device 950, which can be used as appropriate by applications running on device 950.

Device 950 can also communicate audibly using audio codec 960, which may receive spoken information from a user and convert it to usable digital information. Audio codec 960 may likewise generate audible sounds for a user, such as through a speaker, e.g., in a handset of device 950. Such sound can include sound from voice telephone calls, can include recorded sound (e.g., voice messages, music files, etc.) and can also include sound generated by applications operating on device 950.

Computing device 950 can be implemented in a number of different forms, as shown in the figure. For example, it can be implemented as cellular telephone 980. It can also be implemented as part of smart phone 982, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 9 can include sensors that interface with a virtual reality headset (VR headset/HMD device 990). For example, one or more sensors included on computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 950 can use the sensors to determine an absolute position and/or a detected rotation of the computing device in the VR space that can then be used as input to the VR space. For example, computing device 950 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some embodiments, one or more output devices included on the computing device 950 can provide output and/or feedback to a user of the VR headset 990 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 950 can be placed within VR headset 990 to create a VR system. VR headset 990 can include one or more positioning elements that allow for the placement of computing device 950, such as smart phone 982, in the appropriate position within VR headset 990. In such embodiments, the display of smart phone 982 can render stereoscopic images representing the VR space or virtual environment.

In some embodiments, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. As just one example, computing device can be a laser pointer. In such an example, computing device 950 appears as a virtual laser pointer in the computer-generated, 3D environment. As the user manipulates computing device 950, the user in the VR space sees movement of the laser pointer. The user receives feedback from interactions with the computing device 950 in the VR environment on the computing device 950 or on the VR headset 990.

In some embodiments, a computing device 950 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method utilizing at least one processing device to perform operations including:
receiving a pose associated with an object in image content;
generating a plurality of three-dimensional (3D) proxy geometries of the object, the plurality of 3D proxy geometries being based on a shape of the object;
generating, based on the plurality of 3D proxy geometries, a plurality of neural textures of the object, each of the plurality of neural textures defining a plurality of different shapes and appearances representing the object, the plurality of neural textures being configured to reconstruct a hidden portion of the object captured in the image content;
providing the plurality of neural textures to a neural renderer, the plurality of neural textures being provided in a stacked formation, the hidden portion being reconstructed based on the stacked formation of the plurality of neural textures;
generating, by the neural renderer, transparent layers of the object and surfaces behind the transparent layers of the object based on the plurality of neural textures;
receiving, from the neural renderer and based on the plurality of neural textures, a color image and an alpha mask representing an opacity of at least a portion of the object; and
generating a composite image based on the pose, the color image, and the alpha mask.

2. The method of claim 1, further comprising:
rendering a latent texture onto a target viewpoint based at least in part on the pose associated with the object, wherein each of the plurality of 3D proxy geometries include a geometric approximation of at least a portion of the object and the latent texture of the object mapped to the geometric approximation.

3. The method of claim 1, wherein each of the plurality of 3D proxy geometries encode surface light field associated with the object in the image content, the surface light field including specular reflections associated with the object.

4. The method of claim 1, wherein the plurality of neural textures are based, at least in part, on the pose, each of the plurality of neural textures being generated by:
identifying a category of the object;

generating a feature map based on the identified category of the object;
providing the feature map to a neural network; and
generating each of the plurality of neural textures based on a latent code associated with each instance of the identified category and a view associated with the pose.

5. The method of claim 1, wherein at least a portion of the object is a transparent material.

6. The method of claim 1, wherein at least a portion of the object is a reflective material.

7. The method of claim 1, wherein:
the image content includes image data including at least a user; and
the object includes a pair of eyeglasses.

8. A system comprising:
at least one processing device; and
a memory storing instructions that when executed cause the system to perform operations including:
receiving a pose associated with an object in image content;
generating a plurality of three-dimensional (3D) proxy geometries of the object, the plurality of 3D proxy geometries being based on a shape of the object;
generating, based on the plurality of 3D proxy geometries, a plurality of neural textures of the object, each of the plurality of neural textures defining a plurality of different shapes and appearances representing the object, the plurality of neural textures being configured to reconstruct a hidden portion of the object captured in the image content;
providing the plurality of neural textures to a neural renderer, the plurality of neural textures being provided in a stacked formation, the hidden portion being reconstructed based on the stacked formation of the plurality of neural textures;
generating, by the neural renderer, transparent layers of the object and surfaces behind the transparent layers of the object based on the plurality of neural textures;
receiving, from the neural renderer and based on the plurality of neural textures, a color image and an alpha mask representing an opacity of at least a portion of the object; and
generating a composite image based on the color image and the alpha mask.

9. The system of claim 8, further comprising:
rendering a latent texture onto a target viewpoint based at least in part on the pose associated with the object, wherein each of the plurality of 3D proxy geometries include a geometric approximation of at least a portion of the object and the latent texture of the object mapped to the geometric approximation.

10. The system of claim 8, wherein each of the plurality of 3D proxy geometries encode surface light field associated with the object in the image content, the surface light field including specular reflections associated with the object.

11. The system of claim 8, wherein the plurality of neural textures are based, at least in part, on the pose, each of the plurality of neural textures being generated by:
identifying a category of the object;
generating a feature map based on the identified category of the object;
providing the feature map to a neural network; and
generating each of the plurality of neural textures based on a latent code associated with each instance of the identified category and a view associated with the pose.

12. The system of claim 11, wherein the neural renderer uses a generative model to reconstruct unseen object instances within the identified category, the reconstruction based on less than four captured views of the object.

13. The system of claim 8, wherein the plurality of 3D proxy geometries are based on geometry interpolation of shapes that construct the object in the image content.

14. A non-transitory, machine-readable medium having instructions stored thereon, the instructions, when executed by a processor, cause a computing device to:
receiving a pose associated with an object in image content;
generate a plurality of three-dimensional (3D) proxy geometries of the object, the plurality of 3D proxy geometries being based on a shape of the object;
generate, based on the plurality of 3D proxy geometries, a plurality of neural textures of the object, each of the plurality of neural textures defining a plurality of different shapes and appearances representing the object, the plurality of neural textures being configured to reconstruct a hidden portion of the object captured in the image content;
provide the plurality of neural textures to a neural renderer, the plurality of neural textures being provided in a stacked formation, the hidden portion being reconstructed based on the stacked formation of the plurality of neural textures;
generate, by the neural renderer, transparent layers of the object and surfaces behind the transparent layers of the object based on the plurality of neural textures;
receive, from the neural renderer and based on the plurality of neural textures, a color image and an alpha mask representing an opacity of at least a portion of the object; and
generate a composite image based on the color image and the alpha mask.

15. The machine-readable medium of claim 14, further comprising:
rendering a latent texture onto a target viewpoint based at least in part on the pose associated with the object, wherein each of the plurality of 3D texture proxy geometries include a geometric approximation of at least a portion of the object and the latent texture of the object mapped to the geometric approximation.

16. The machine-readable medium of claim 14, wherein the plurality of neural textures are based, at least in part, on the pose, each of the plurality of neural textures being generated by:
identifying a category of the object;
generating a feature map based on the identified category of the object;
providing the feature map to a neural network; and
generating each of the plurality of neural textures based on a latent code associated with each instance of the identified category and a view associated with the pose.

17. The machine-readable medium of claim 14, wherein at least a portion of the object is a transparent material.

18. The machine-readable medium of claim 14, wherein at least a portion of the object is a reflective material.

19. The machine-readable medium of claim 14, wherein:
the image content includes image data including at least a user; and
the object includes a pair of eyeglasses.

20. The machine-readable medium of claim 14, wherein the composite image is generated using a Generative Latent Optimization (GLO) framework and perceptual reconstruction losses.

* * * * *